March 15, 1966 G. FLOWER, JR., ET AL 3,240,621
HIGH VISCOSITY DISPERSIONS OF MAGNETIC PIGMENTS
Filed Nov. 14, 1960
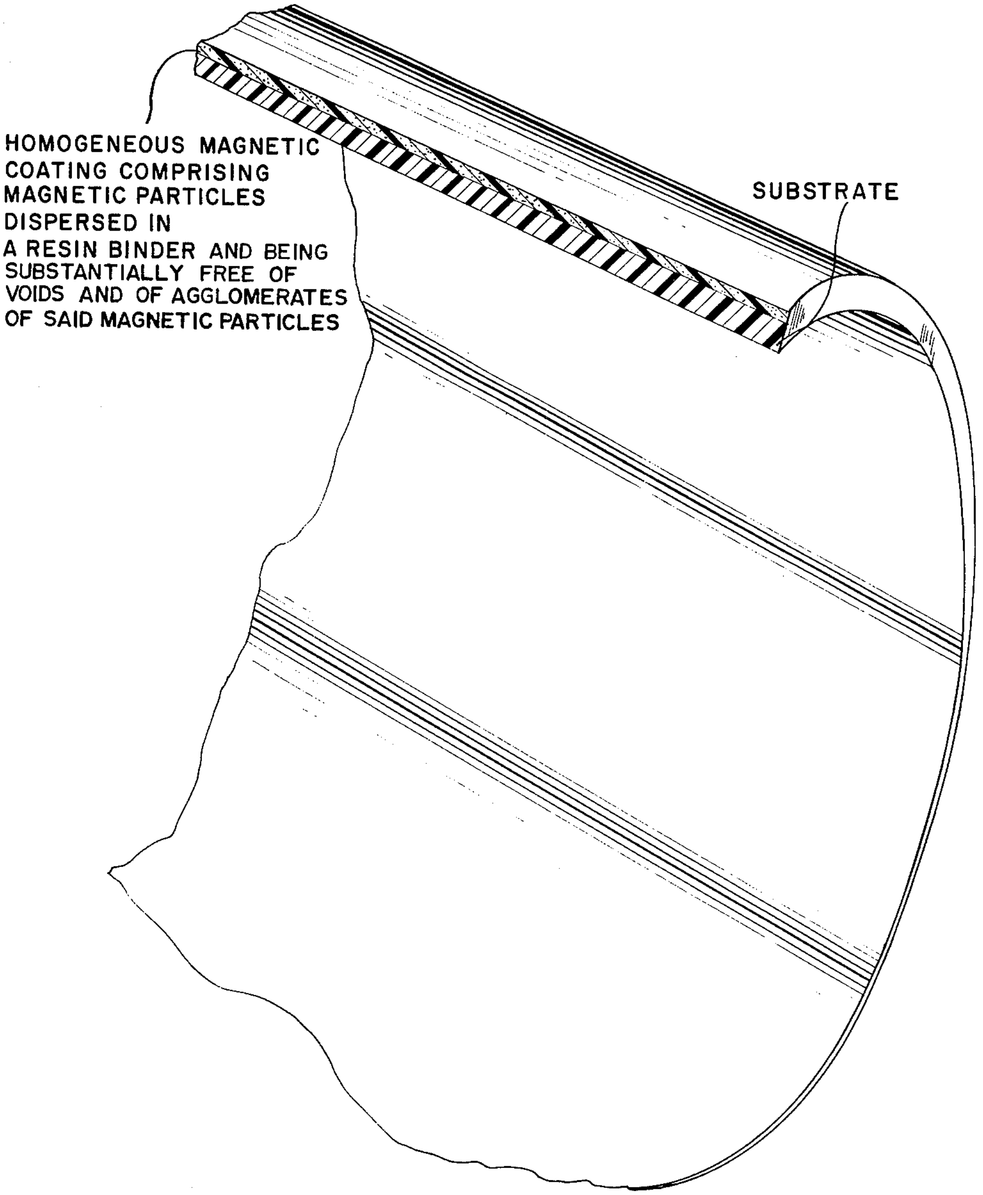
INVENTORS
Guiles Flower
Albert L. Tufano
Frederick W. Roberts
BY
Curtis, Morris, & Safford
ATTORNEYS United States Patent Office 3,240,621 Patented Mar. 15, 1966

3,240,621

HIGH VISCOSITY DISPERSIONS OF MAGNETIC PIGMENTS

Guiles Flower, Jr., Darien, Albert L. Tufano, Stratford, and Frederick W. Roberts, Fairfield, Conn., assignors to Dictaphone Corporation, Bridgeport, Conn.

Filed Nov. 14, 1960, Ser. No. 68,863
6 Claims. (Cl. 117—93.2)

This invention relates to improved media for magnetic recording, and relates in particular to improved magnetic coatings for substrates such as tapes used in recording or reproducing information, to compositions for coating the substrates, to coated substrates, and to methods of making the coatings, compositions, and coated substrates.

In one important aspect thereof the present invention concerns novel magnetic coatings providing output levels significantly higher than those of products now known to the art, and, additionally, more freedom from undesirable background noise. These novel coatings specifically comprise magnetic particles homogeneously distributed therethrough with a nearly complete absence of voids and agglomerates.

It is known in the art to record information on bodies, or substrates, coated with a magnetic material. These bodies are commonly flexible, and may be in the form of sheets, strips, or endless bands. The magnetic coatings are films usually comprising a finely-divided particulate magnetic material such as gamma iron oxide, $Fe_2O_3$, in a matrix which binds the particles to one another and to the substrate.

By methods known to the prior art, the magnetic coating is commonly applied to substrate bodies as a dispersion of the magnetic particles in a lacquer comprising the binder and a solvent. This lacquer dispersion is smoothed on to the surface of the substrate by mechanical means such as knife coating, roll coating, and the like, and the solvent is then removed from the lacquer film by evaporation, generally with the use of a drying oven.

It is also common to orient the finely-divided magnetic particles in the thin film coating the substrate, before the solvent is removed. While the magnetic particles are still capable of being moved in the matrix, they may be magnetically aligned into a desired orientation by application of a magnetic field for example using techniques taught in U.S. Patent 2,011,697 granted August 20, 1935 or U.S. Patent 2,711,901 granted June 28, 1955. After removal of the solvent, the magnetic particles retain this orientation within the relatively rigid binder (cf. Canadian Patent 554,258).

The magnetic material usually used in the formation of magnetic coatings is acicular $\gamma$-$Fe_2O_3$, finely-divided into particles the dimensions of which are less than, or about, one micron. $Fe_2O_3$ particles of this size are substantially single magnetic domains, spontaneously and permanently magnetized, and exert on each other mutual magnetic forces which tend to agglomerate the particles into larger aggregates.

Apparently these magnetic forces work counter to attempts to distribute the magnetic particles uniformly throughout the binder of a magnetic coating, and particularly tend to disrupt ordered arrangements imposed on the particles by external magnetic fields applied during processing for purposes of orienting the particles. Thus there is a tendency toward the formation of agglomerates or aggregates of magnetic particles, which may result in a substantially non-uniform distribution of particles in the binder matrix. The agglomeration of magnetic particles into aggregates gives a coating in which the particles, because they are aggregated, are distributed inhomogeneously through the lacquer film applied in the coating process. On removal of the solvent from the lacquer, regions of binder matrix containing substantially no magnetic particles are formed. These magnetically "thin" portions of the coating become magnetically saturated more easily than other portions of the coating containing a higher content of magnetic particles. Once magnetically saturated, they then behave to a magnetic field as would an air space, and thus introduce undesirable discontinuities into the desired uniform magnetic properties of the coatings.

The inhomogeneous distribution of magnetic particles also favors the formation of "voids," i.e. regions of low density which may contain entrapped air. Tests have indicated that the presence of such voids in any substantial amount seriously reduces the electrical output of the magnetic coating.

The preferred coatings of the present invention comprise a magnetically homogeneous, nearly void-free, substantially uniform, high-density dispersion of finely-divided $\gamma$-$Fe_2O_3$ in a resinous binder. The coatings are advantageously applied in a thin layer on a flexible substrate conveniently in the form of a band, strip, or sheet. As compared with a theoretically perfect coating containing no voids, the coatings of this invention have less than 10% voids when the magnetic particles are non-oriented (i.e. when no specific steps have been taken to orient the particles in parallel directions), and the coatings have less than about 5% voids when the particles are magnetically oriented in accordance with prior art teachings. These new coatings provide substantially greater total signal voltage output than is obtainable from present commercial coatings. For long wavelengths, an improvement of about 5 decibels has been obtained; at shorter wavelengths, the new coatings show a response improved by about 3 decibels over prior art materials. Moreover, this output improvement is accompanied by a reduction in D.C. noise.

The $\gamma$-$Fe_2O_3$ preferred in the magnetic coatings of the invention is acicular, with a length-to-width ratio of about 5 and an average particle length between 0.5 and 1 micron. The acicular particles have a small demagnetization factor and can easily be aligned by an external magnetic field to lie in a preferred direction of movement of the coating during recording.

The resin binder may be any one of a number of compositions known to the art, and preferably comprises one or more synthetic resins and a plasticizer or plasticizers therefor. Canadian Patent 535,575, granted January 8, 1957 to Lueck describes a number of suitable resin binders; for example, a copolymer of 45 percent ethyl acrylate and 55 percent methyl methacrylate (soluble in toluene-acetone mixtures), a copolymer of equal parts of n-butyl acrylate and methyl methacrylate (soluble in toluene), and a mixture of 4 parts of a copolymer of 90 parts vinyl chloride and 10 parts vinyl acetate with 1 part of a rubbery copolymer of 65 parts butadiene and 35 parts acrylonitrile (soluble in methyl isobutyl ketone) are taught therein. U.S. Patent 2,799,609, granted July 16, 1957 to Dalton describes cellulose acetate binders. U.S. Patent 2,849,409, granted August 26, 1955 to Evans, describes a binder comprising a methyl methacrylate polymer containing 15 percent–75 percent of cellulose acetate butyrate. Other suitable resin binders will be apparent to those skilled in the art.

Particularly good results have been obtained using cellulose ester resins such as cellulose acetate or butyrate, or a cellulose acetate butyrate, acrylic ester resins, and vinyl resins as pigment binders. Plasticizers, such as dioctyl phthalate and tricresyl phosphate, known to the art for use with the above resins, are advantageously combined therewith to lend additional flexibility to the coatings.

The substrates over which the magnetic coatings of the invention are applied are also known to the art. For flexible tapes, bands, or sheets, materials such as cellulose acetate or "Mylar" (polyethylene terephthalate) are preferred. The thickness of the substrate is not critical, and can vary widely depending on ultimate use and the inherent properties, such as tensile strength, of the materials. For tapes, cellulose acetate films between about 0.001 in. and about 0.003 in. thick, preferably about 0.0015 in. thick, are used. Thinner films of "Mylar," ranging between 0.0005 in. and 0.0015 in. in thickness, are also conveniently employed. The magnetic coatings are applied to these substrates with a thickness between 0.3 mil and 0.7 mil, and contain between about 70–80 percent by weight, preferably about 75 percent by weight, of magnetic solids.

The high-density coatings are applied by a process employing a thick, non-Newtonian fluid as the coating vehicle. In the prior art, coating usually has been accomplished by mixing magnetic solids directly into a fluid lacquer and spreading the mixture into a film. In a non-Newtonian fluid having a finite yield strength, such as in the coating dispersions of the present invention, there will be no flow (or movement of a body in the fluid) until a shear force exceeding the yield strength of the fluid is applied. If magnetic particles are dispersed in a non-Newtonian vehicle of this type, no movement of the particles will result unless the forces of magnetic attraction between the particles exceed the yield strength of the fluid. In consequence, a high degree of immobilization of the dispersed particles is achieved; aggregation of the particles, the development of magnetic inhomogeneities, and the formation of voids in the coating are minimized.

This behavior is to be contrasted with the behavior of particles in a Newtonian fluid in which the force resisting movement of the particles is the viscous drag of the fluid in which they are suspended. The viscous drag on a body moving in the fluid is a function of the viscosity of the fluid and the velocity of the moving body., In such Newtonian dispersions, movement of the magnetic particles, however slow, can be expected. Prior art coating vehicles have either had the characteristics of Newtonian fluids, or, if non-Newtonian, have had much lower yield strengths than those which characterize the coating vehicles according to the present invention. Correspondingly greater particle mobility and agglomeration are typical of these prior art formulations.

The non-Newtonian coating mixtures herein described are conveniently prepared by milling a finely-divided magnetic pigment into a thermoplastic resin binder on a roll mill. The dry resin composition is first rolled on warm rolls to produce a softened flexible sheet. The dry magnetic particles are then placed onto this sheet and the sheet is re-run through the roll mill. On exit from the mill, the hot sheet is cut into smaller pieces and again fed into the entrance rolls of the roll mill. Rolling is continued for 8–10 minutes until the magnetic particles have been uniformly dispersed in the resin binder by the pressure and shearing action of the rolls.

After the magnetic particles are dispersed through the resin binder, the sheet coming from the rolling mill is cooled, cut into smaller pieces and fed into conventional grinding apparatus where it is reduced to chips. The sheet may be subdivided into particles of a size conveniently less than ¾ inch in their largest dimension, although particles in a size range less than ½ inch are preferred. Although the material may be reduced to a powder, it is usually suitably subdivided so that the particles are no larger than ¼ inch or ⅛ inch in their largest dimension.

These chips are next blended with solvents in a ball mill to prepare the viscous non-Newtonian coating mixtures preferred in the practice of the invention. Volatile organic solvents, both aliphatic and aromatic, and the chips prepared as described above are milled in a ball mill until uniform dispersion of all the components in the solvents is achieved. Usually, the ball-milling continues for from about 20 to about 40 hours. The amount of solvent is kept at the minimum necessary for solution of the resin binder and dispersion of insoluble solids, so that thick gel-like dispersions are obtained.

The solvent employed is not critical to the invention, and may be an aliphatic, cycloaliphatic, or aromatic liquid. Alcohols, ketones, esters, ethers, hydrocarbons, and the like may be used, depending on the resin binder to be dissolved. The amount of solvent employed will vary with the solvent power of the solvent for the pigment-resin combination to be dispersed. The amount of solvent should be kept to a minimum, so as to obtain dispersions having an apparent viscosity (as hereinafter defined) above 50,000 centipoises at 75°–80° F. e.g. up to 200,000 centipoises, and preferably between about 100,000 and about 150,000 centipoises. The resultant dispersions are thick, highly immobile gels which can, however, be made sufficently fluid to pour by vigorous stirring.

Since the coating mixtures are non-Newtonian, true viscosity values cannot be determined. By the "apparent viscosity" of these mixtures is meant the average of the closest viscosity values obtained by the following method. The gelled mixture is agitated for 30–60 seconds with an electric mixer to break the gel. A viscosity reading using a Brookfield viscosimeter is then made on the fluid within 30 seconds. The viscosimeter reading is made after the viscosimeter dial has made one complete revolution with the clutch engaged, and then five revolutions with the clutch disengaged; then the clutch is re-engaged for the reading. The mixture is then agitated for 30 seconds and another reading is made in the same fashion within 30 additional seconds. Generally, the initial readings will drop in value to a minimum, and then rise slightly on further measurement. The average of the closest-lying values is taken and converted to centipoises.

The ball-milled high viscosity dispersions are coated on to a substrate material by techiques and apparatus well known in the prior art, such as by roll coating or application with a knife edge.

The density of a magnetic coating so prepared and laid on a substrate can be found experimentally from measurements of weight, area, and thickness. A small piece of coated tape of known area and thickness is weighed, for example, and its weight and thickness are again measured after the magnetic coating has been removed, e.g. by solvents. The weight and thickness of the coating itself are then found by difference, and the density of the coating deterimned using the relationship:

$$\text{Density}=\frac{\text{weight of coating}}{\text{area}\times\text{thickness of coating.}}$$

The theoretical density of a coating comprising two components can be determined from the relationship:

$$\text{Density}=\frac{100d_1}{W_1+W_2\frac{d_1}{d_2}}$$

where $W_1$ and $d_1$ are respectively the percent by weight and density of the first components and $W_2$ and $d_2$ have similar meaning for the second component.

Assuming a void-free coating, a theoretical maximum density for a coating can be calculated using a value of 4.98 gm./cm.$^3$ for the density of $\gamma$-$Fe_2O_3$, based on the molecular weight of the oxide and the size of the crystallographic unit cell. For a coating comprising 75 percent by weight of $Fe_2O_3$ and 25 percent of a binder comprising cellulose acetate butyrate, "Acryloid B–72" (a commercial acrylic ester resin sold by Röhm & Haas), and tricresyl phosphate, and having a density of 1.188 gm./cm.$^3$, a maximum void-free theoretical density of 2.77 gm./cm.$^3$ is calculated. From comparisons of this theoretical value with experimentally determined density measurements, an evaluation of the percent of voids in the coatings can be made. The coatings of the present invention contain fewer than 10 percent of voids when the particles are non-oriented, and preferably contain as few as 2.5 percent, for example, when the particles have been magnetically oriented.

The low number of voids in the coatings may be in part due to the small amounts of solvent which have to be removed in drying the coatings. Also, in magnetically oriented coatings according to the invention, the high degree of alignment of the particles reduces "jackstraw" effects and permits a greater degree of compaction of the particles. The process of particle alignment in a magnetic field may be beneficial in squeezing entrapped air from the coating, thus further decreasing the number of voids in the coating.

The high degree of particle alignment in the coatings according to the invention is shown by the front to side output ratios of between about 11–13 db observed in oriented tapes prepared with these coatings, as compared with a front to side ratio of about 3 db in these tapes when unoriented, or a ratio of about 9 db for the best oriented prior art materials. The ratios are determined by measuring tape output in the direction of alignment ("front") and a direction perpendicular thereto in the plane of the tape ("side").

The substantial reduction in voids and magnetic inhomogeneities in the coatings according to the present invention permits the production of tapes which before orientation show output levels equal to those only obtainable in the prior art by magnetic orientation.

The accompanying drawing, which is a perspective view partly in section, shows a magnetic recording tape including a magnetic coating in accordance with the present invention. The drawing is enlarged better to show the details of the tape.

A better understanding of the invention and of its many advantages can be had by referring to the examples below, given by way of illustration.

EXAMPLE 1

The prepartion of a typical high-viscosity coating composition proceeds as follows. A matrix comprising 108 parts by weight of ½ sec. cellulose acetate butyrate, 61 parts of "Acryloid B72," and 81 parts of tricesyl phosphate were fluxed on a roll mill at 40 p.s.i steam. 750 parts of gamma ferric oxide were blended into the matrix over a 15 minute period, and rolling was continued until the oxide was homogeneously distributed throughout the matrix. The blend was removed from the mill as a soft sheet, cooled, and broken into one-eighth inch "chips."

For the preparation of a non-Newtonian coating vehicle from this composition, the following ingredients were blended by milling in an octagonal steel ball mill with steel balls:

| Component: | Parts by weight |
|---|---|
| "Chips" | 1288 |
| Ethanol | 115 |
| n-Butanol | 19 |
| Toluene | 578 |
| D.C. Fluid #200 (1000 centistokes) (a silicone polymer) | 0.2 |
| | 2000.2 |

The mixture was milled for 20 hours, and had a viscosity between 125,000 and 140,000 centipoises at 75°–80° F.

As described in detail in Examples 2 and 3 below, comparative tests were run on tapes coated with a non-Newtonian vehicle and a more fluid vehicle as used in the prior art.

EXAMPLE 2

188 parts by weight of "Vinylite VYHH" ( a vinyl chloride-vinyl acetate copolymer containing about 90 percent by weight of vinyl chloride), 68 parts of dioctyl phthalate, 5 parts of "ferro 900" (a vinyl resin stabilizer), and 250 parts of $\gamma$-$Fe_2O_3$ were fluxed on a roll mill as in Example 1. An additional 500 parts of $\gamma$-$Fe_2O_3$ were added during milling, giving a final composition containing pigment and binder in a 75:25 weight ratio. "Chips" were formed from the blend by cooling and breaking.

Next, a dispersion similar to those used in the prior art for coating and containing 1000 parts by weight of these chips, 493 parts of toluene, 493 parts of methyl ethyl ketone, and 14 parts of "Aerosol OT" (dioctyl ester of sodium sulfosuccinate) was prepared by milling these ingredients for 20 hours in a ball mill. The milled dispersion was relatively fluid and had a viscosity of 13,260 centipoises at 74° F.

EXAMPLE 3

1310 parts by weight of the chips prepared as described in Example 2 were dispersed in 340 parts of toluene and 340 parts of methyl ethyl ketone, with 10 parts of "Aerosol OT." After milling for 20 hours in a ball mill, the dispersion had a viscosity of 144,400 centipoises at 79° F., and was non-Newtonian.

The dispersions of Examples 2 and 3 were used to coat "Mylar" tapes. The dried coating had a thickness of 0.7 mil. Tapes with oriented and non-oriented coatings were prepared for each sample. The densities of the tapes were determined experimentally and compared with the theoretical density of 2.79 gm./cc. The results are tabulated in Table I below.

*Table I*

| Coating | Material | Viscosity (centipoises) | Magnetic Orientation | Observed Density (gms./cc.) | Percent of Voids |
|---|---|---|---|---|---|
| A | Example 2 | 13,260 | No | 2.25 | 19.7 |
| B | Example 2 | 13,260 | Yes | 2.40 | 14.0 |
| C | Example 3 | 144,000 | No | 2.71 | 2.8 |
| D | Example 3 | 144,000 | Yes | 2.74 | 1.8 |

Comparative performance tests were made on tapes coated to a dried thickness of 0.7 mil with the compositions of Examples 2 and 3. The results are given in Table II below, and show the superiority of the coatings made according to Example 3. In the tests, a 0.014″ width track and a 0.4 mil gap length were used with a track speed of 4 i.p.s. and an A.C. bias of 20 kc. Recordings were made at 200 and 4000 cycles using that bias current which gave the maximum output at 300 c.p.s. in each case. A signal level was used which produced playback distortion of 7½ percent using a flat frequency characteristic amplifier rather than a compensated one. The output from the reproduce system was measured by means of a vacuum tube voltmeter. Using these standardized tests, it is possible to determine and compare the maximum output possible at the predetermined distortion level for the various processing methods. Using the values obtained for the prior art unoriented tape as a zero point, as shown in Table II, line A, the other values given show the improvement obtained by orientation and by the use of high viscosity coatings prepared as previously described.

The D.C. noise level measurement used as a basis of comparison is a simplified version of the W–T–0061, Section 4.5.2 Military Specification on signal to D.C. noise ratio. The D.C. noise level, which is an indication of the noise "behind the signal," is measured by reproducing with a direct current supplied to the reproduce head sufficient to ensure magnetic saturation of the recording medium as it moves under the head. The medium is erased with A.C. before and after the test, and the head is demagnetized before further tests are made.

Any variations in the continuity of the coating produce signal voltages in the head which are amplified and measured by a vacuum tube voltmeter. The lower these readings, the lower is the effective background noise level of the recording system. In place of the actual D.C. noise reading, Table II shows the improvement in the signal over the noise, which is a better indication of the comparative figures of merit for low viscosity processing as against high viscosity processing.

*Table II*

| Coating | Improvement in Signal Over D.C. Noise | Output | |
|---|---|---|---|
| | | 0.020" Wave Length (200 cps.) | .001" Wave Length (4,000 cps.) |
| | *Db* | *Db* | *Db* |
| A | 0 | 0 | 0 |
| B | −2.5 | +3.5 | +1 |
| C | +1.0 | +2.5 | +7.5 |
| D | +11 | +6.5 | +10.5 |

Although specific embodiments have been shown and described, it wil be understood that they are illustrative, and are not to be construed as limiting on the scope and spirit of the invention.

We claim:

1. A composition for application to a substrate to give a magnetic recording medium consisting of said substrate and a magnetic coating thereon, said composition comprising a non-Newtonian dispersion of finely-divided magnetic particles and a resin binder in a volatile solvent therefor, said dispersion having an apparent viscosity of at least 50,000 centipoises at 75°–80° F.

2. The method of making a composition for application to a substrate to give a magnetic recording medium consisting of said substrate and a magnetic coating thereon, which method comprises admixing finely-divided magnetic particles with a thermoplastic resin binder at a temperature at which said resin is plastic, cooling the mixture until brittle, dividing the cooled brittle mixture into particles about one-half inch in their largest dimension, and then dispersing said mixture in an amount of volatile solvent therefor sufficient to give a non-Newtonian dispersion having an apparent viscosity of at least 50,000 centipoises at 75°–80° F.

3. The method of making a magnetic recording medium which comprises applying to a substrate a thin coating of a non-Newtonian dispersion comprising finely-divided magnetic particle and a resin binder in a volatile solvent therefore, said dispersion having an apparent viscosity of at least 50,000 centipoises at 75°–80° F., and said coating being substantially free of agglomerates of said magnetic particles, and then removing said solvent from said coating.

4. The method of making a magnetic recording medium which comprises applying to a substrate a thin coating of non-Newtonian dispersion comprising finely-divided acicular magnetic iron oxide particles and a resin binder in a volatile solvent therefor, said dispersion having an apparent viscosity of at least 50,000 centipoises at 75°–80° F., and said coating being substantially free of agglomerates of said magnetic particles, and then removing said solvent from said coating.

5. The method according to claim 4 wherein said iron oxide particles are oriented by passing said substrate, after coating but before removal of said solvent, through a magnetic field.

6. In the method of making a magnetic recording medium by applying to a substrate a coating of a mixture of finely-divided magnetic particles and a resin binder in a solvent, and then removing said solvent from said coating, the improvement which comprises applying said mixture as a non-Newtonian dispersion of said magnetic particles and binder in a solvent, said dispersion having an apparent viscosity of at least 50,000 centipoises at 75°–80° F., and said coating being substantially free of agglomerates of said magnetic particles.

References Cited by the Examiner

UNITED STATES PATENTS

| | | | |
|---|---|---|---|
| 2,613,160 | 10/1952 | Walton | 260—37 |
| 2,633,431 | 3/1953 | De Sylva. | |
| 2,711,901 | 6/1955 | Von Behren. | |
| 2,796,359 | 6/1957 | Speed. | |

OTHER REFERENCES

Simonds and Ellis Handbook of Plastics, N.Y., Van Nostrand Co., 1943, pages 460 and 530–540.

Haynes: Elements of Magnetic Recording, pages 75–76, Prentice-Hall, N.J., 1957.

WILLIAM D. MARTIN, *Primary Examiner.*

RICHARD D. NEVIUS, MURRAY KATZ, *Examiners.*